United States Patent Office 3,217,879
Patented Nov. 16, 1965

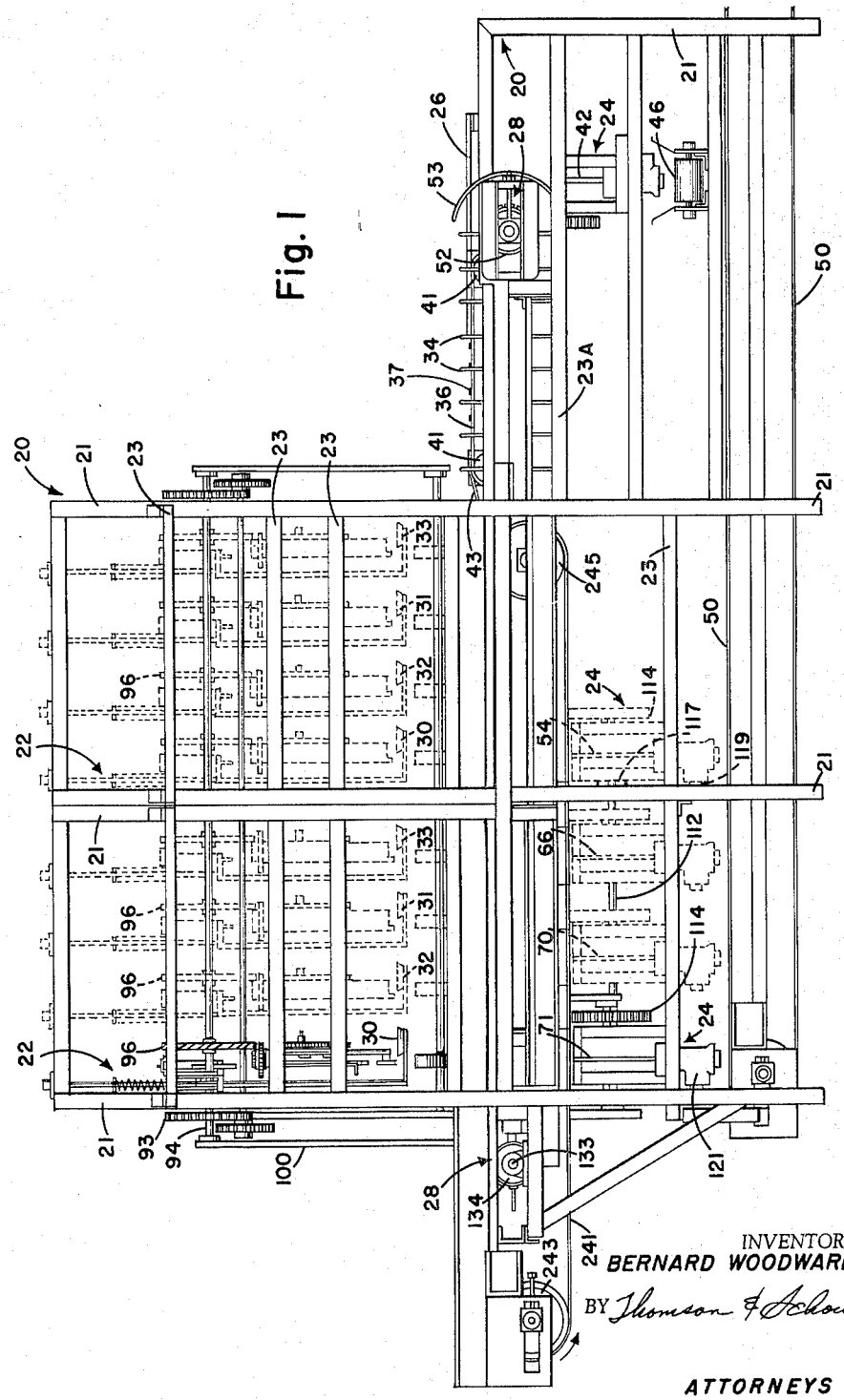
Fig. I
INVENTOR.
BERNARD WOODWARD JR.
BY Thomson & Schoue
ATTORNEYS

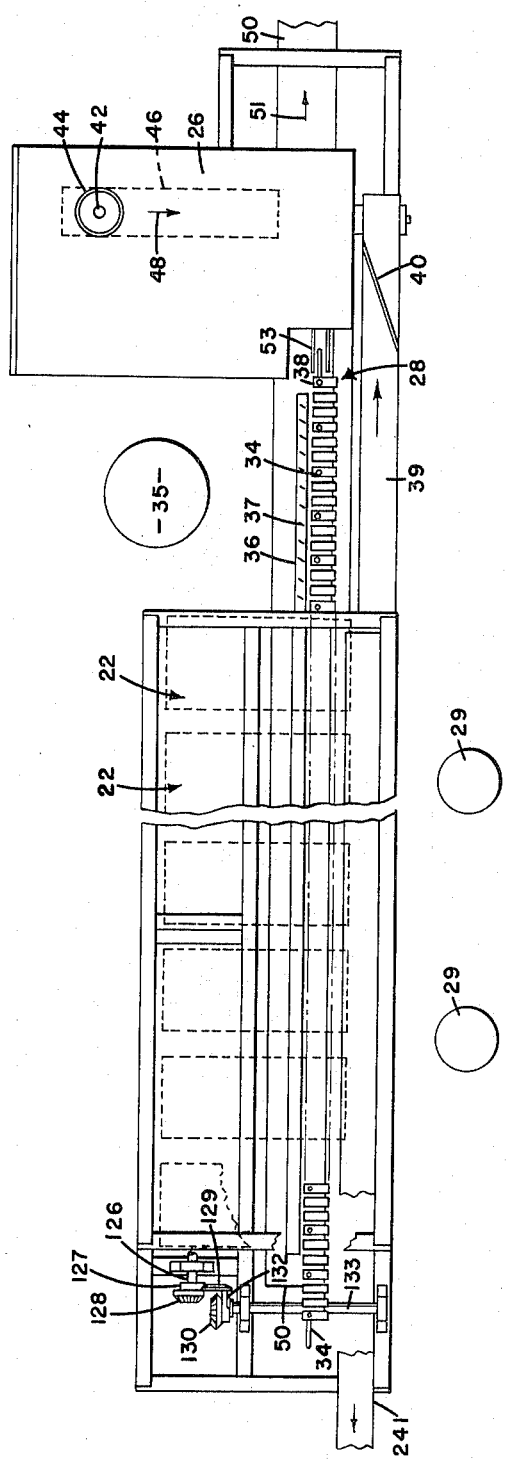

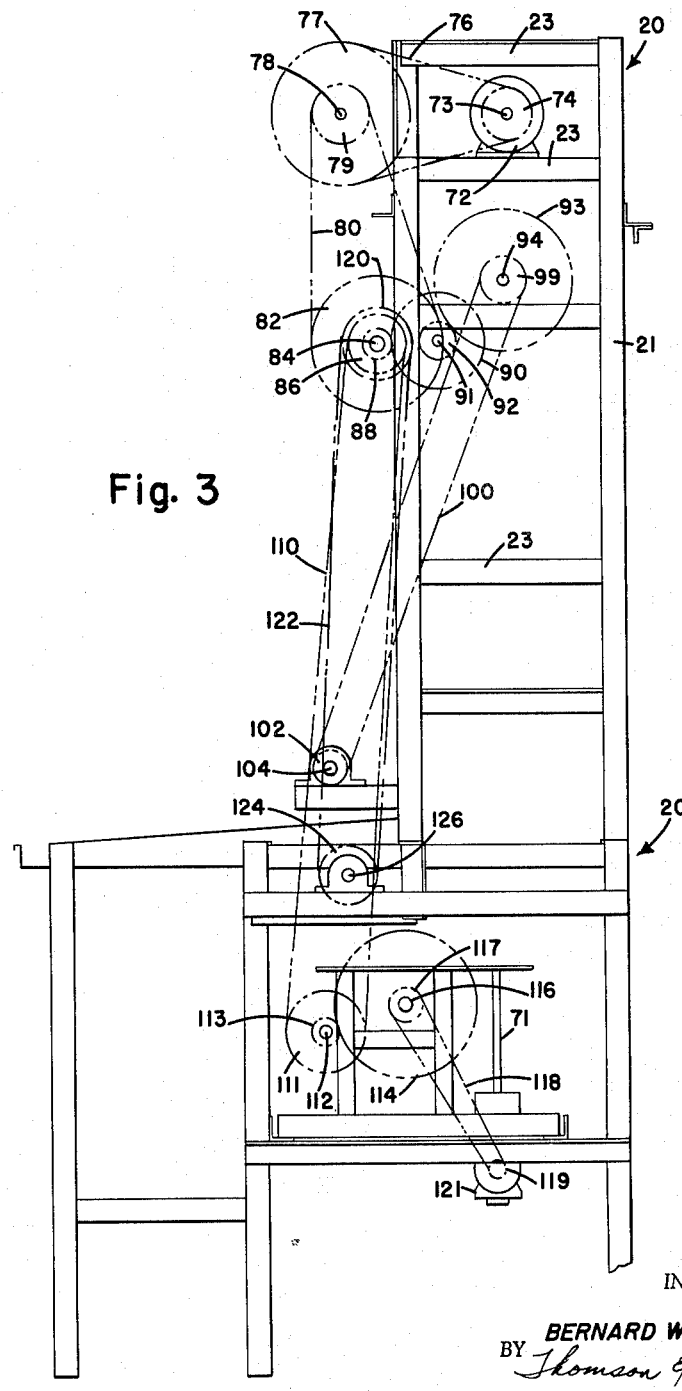

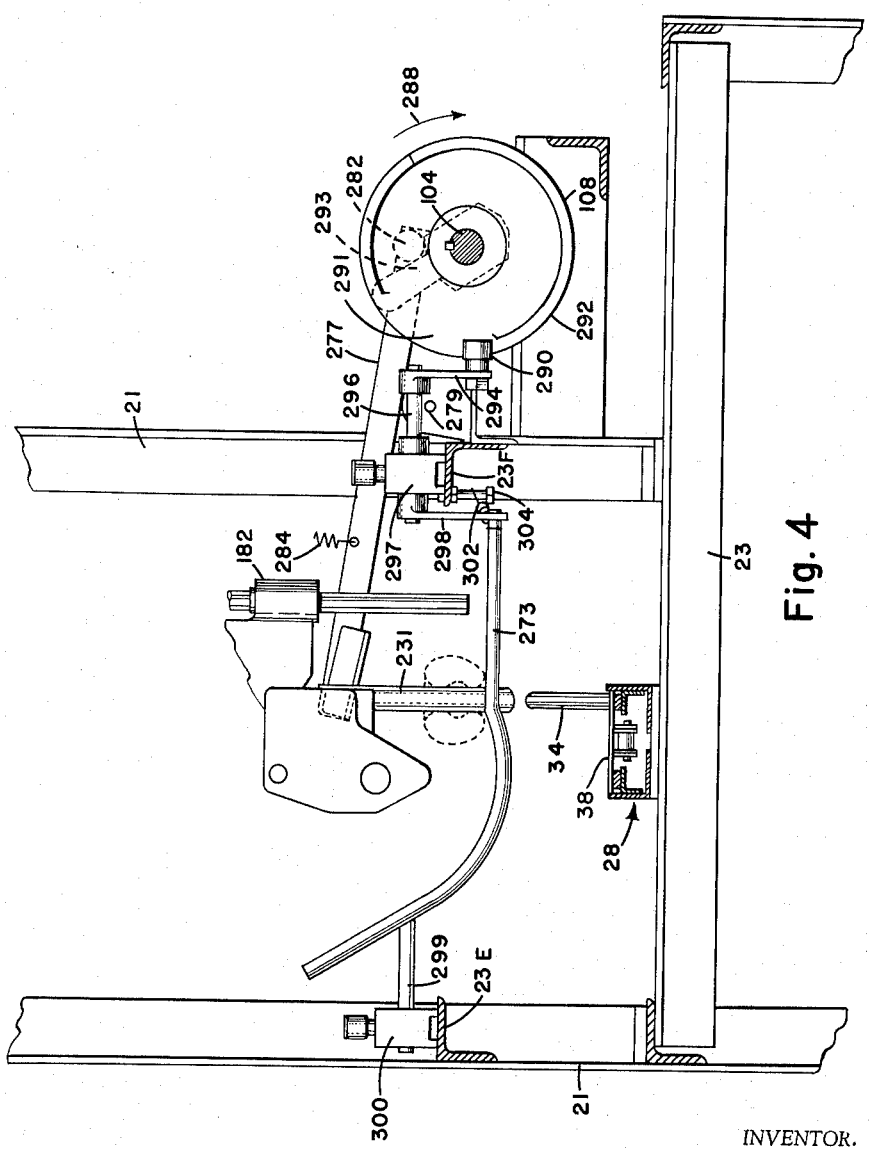

3,217,879
APPARATUS FOR PROCESSING APPLES
Bernard Woodward, Jr., Rochester, N.Y., assignor to F. B. Pease Company, Rochester, N.Y., a corporation of New York
Original application Ser. No. 49,187, Aug. 12, 1960. Divided and this application Mar. 4, 1963, Ser. No. 262,589
9 Claims. (Cl. 209—122)

This invention relates to an improved apparatus for processing apples and is a division of my issued United States Letters Patent No. 3,134,415 filed August 12, 1960, issued May 26, 1964, one object of this invention being the provision of a more satisfactory apparatus for processing apples.

Because of the large number of apples processed by the food industry for cooking, freezing, canning and related uses, it is desirable to have a machine which will automatically pare, core and slice the apple with a minimum of manual handling of the apples during these processes. In order to process apples in a manner which will insure a finished product completely free of skin and without spoiled spots, it is necessary that there be an inspection of all apples sometime after the coring and paring processes have been accomplished. Following the inspection, it is necessary for the excess skin and spoiled spots of the apples, not removed by automatic paring, to be cut away from the apple manually. It is an object of my invention to provide apparatus for minimizing handling thereof.

There are a number of hair-like sprouts commonly referred to as the calyx surrounding the core on apples at the end opposite the stem, that being the blossom or bottom end, which food processors are most anxious to have removed prior to cooking, because after cooking of the apples, these hair-like particles present an appearance simulating fly particles in the applesauce. During the automatic processing of apples as described above, it is difficult to discover the apples of which these hair-like particles have not been removed unless the apple is inspected while bottom end up. Therefore, it is a further object of my invention to provide an apparatus which will orient the apples so that the bottom ends of the apples are up while being inspected, following the coring and paring of the apples.

It is also an object of my invention to provide for a controlled orientation of the apple during all phases of processing from the time the apple is fed into the machine until it is released by the slicer mechanism.

A further object of my invention is to provide an apparatus which will minimize the number of personnel necessary to carry out the efficient high quality production of pared and cored apples.

A further object of this invention is to provide improved apparatus for inspecting apples for separation of ones requiring additional trimming.

Other objects and advantages of this invention will be particularly set forth in the claims and will be apparent from the following description of this one embodiment of my invention when taken in connection with the accompanying drawings in which:

FIG. 1 is a front elevational view of an apple processing machine embodying the present invention;

FIG. 2 is a top plan view of the machine shown in FIG. 1;

FIG. 3 is a diagrammatic side elevational view of the machine of FIG. 1 showing the drive mechanism for controlling the separate functions of this embodiment of my invention; and FIG. 4 is an enlarged fragmentary side elevational view of an apple retaining and ejector mechanism as seen from the right with respect to FIG. 1 with parts in section.

Referring to FIG. 1, this embodiment of my invention preferably includes a frame generally indicated by the numeral 20 consisting of a plurality of vertical members 21 and a plurality of horizontal members 23, all welded or bolted together to form a rigid unit for supporting the component parts of this embodiment of my invention. The described embodiment mainly comprises eight peeling and coring machine units generally indicated by the numeral 22, four slicer machine units generally indicated by the numeral 24 mounted on the frame 20 directly below the eight paring and coring units 22, one slicer 24 located substantially to the right of the other four slicers and directly below a trimmer table generally indicated by the numeral 26 where spoiled areas of the apples and excess skin are trimmed from apples that are rejected by an inspector as they pass to the right with respect to FIG. 1 on a conveyor belt generally indicated by the numeral 28.

I have determined that substantially the maximum efficiency for an apple processing machine of the nature described here which would be readily marketable should include eight paring and coring machine units, in combination with four slicing machine units provided to slice the apples that are not rejected by the inspector and one slicing machine unit provided for slicing the rejected apples after trimming. With such a unit, only two operators are required for feeding 160 apples per minute into the eight paring and coring units, one inspector to check the pared and cored apples and reject those requiring additional trimming and from one to three trimmers, the norm being two. This means that the normal personnel requirement for this particular unit would be five. Previous machines of this general nature utilized four paring and coring machine units in combination with four slicing machine units and produced 80 pared, cored and sliced apples per minute or one-half the production of the described embodiment. The trimmer personnel of these old machines had to transfer all apples from the paring and coring units to two slicing units. The latter type of machine required one feeder and four trimmers for each four units, totaling five operators to operate a machine producing one-half the quantity of production of the described embodiment of my invention. Thus, my invention reduced the labor cost by one-half. This is an extensive saving to the apple processor who uses my invention.

In operation, the apples to be processed are carried on a conveyor belt (not shown) between the frame 20 and the feeder operators standing in the positions indicated by the numeral 29 (FIG. 2). Each of the two feeder operators 29 supply apples to four paring and coring units. The feeder operators 29 remove the apples from the belt two at a time, and with one apple in each hand, they place the apples in alternate cups 30 and 31 (FIG. 1). After the apples have been positioned in the cups 30 and 31, these cups are pivoted backwardly and upwardly as viewed in FIG. 1 and the apples are inserted on a spindle or spiked apple holder described in my Patent No. 3,134,415, after which the apple is pared and cored as described in detail in my Patent No. 3,134,415. While cups 30 and 31 are being pivoted to the back and moved upwardly as viewed in FIG. 1, cups 32 and 33 are pivoting into the position shown in FIG. 1, so that the feeder operators 29 may then place an apple in each one of these two cups. Cups 32 and 33 are pivoted by means described hereinafter, in the same manner as cups 30 and 31, so that cups 32 and 33 are inserting apples on spindles described in my Patent No. 3,134,415 at the same time that cups 30 and 31 are pivoted into the position shown in FIG. 1. Thus, the feeder operators 29 placing apples in the cups can work almost continuously placing two at a time alternately in cups 30 and 31 and then 32 and 33. The linkage by which cups 30–33 are operatively effective to accomplish the pivotal action just described, is recited in detail in my issued Patent No. 3,134,415. After the apple has been inserted on the spindle (not shown) it is pared and cored by operations described in detail in my Patent No. 3,134,415.

Referring to FIG. 2, after the apples have been pared and cored, they are deposited in an oriented position on pins 34 rigidly mounted on a conveyor system generally indicated by the numeral 28. The apples are then transported to the right as viewed in FIG. 1, past an inspector sitting or standing in the position designated by the circle 35 shown in FIG. 2. A belt 36 having a rough surface and a plurality of cleats 37 mounted diagonally thereon travels in an elevated parallel plane with respect to the conveyor system 28. The belt 36 engages two pulleys 41 around which the belt travels to the right as shown in FIG. 2 immediately adjacent conveyor belt 28. The pins 34, as will be noted in FIG. 2, are positioned on each segment 38 of conveyor 28 in a position close to the side adjacent belt 36. Pins 34 are positioned on segments 38 to permit the apples conveyed thereby to overhand each segment 38 and to be engaged by belt 36. As seen in FIG. 1, a small ramp 43 is provided to elevate the apple on the pin 34 to the level of belt 36 as it is being conveyed to the right. Belt 36 travels at a different rate of speed than conveyor 28 in order to rotate the apples continuously as they pass in front of the inspector at 35.

It is significant that the apples are placed in the cups 30-33 by the feeder operators 29 in an upright position with the stems extending upwardly; it is necessary that the apples be properly oriented when placed in the cups so that during the various processing phases they can be maintained in the same oriented position. After the apples are pared and cored, they are deposited on pins 34 in an inverted position by inverting means described in my issued Patent No. 3,134,415. One of the major reasons for orienting the apples is so they will be conveyed past the inspector at 35 in an inverted position. Apples have hair-like sprouts or fuzz surrounding the blossom end of the apple. It is undesirable to permit any of this fuzz to get into the applesauce, sliced apples, or other form of processed apples, due to the fact that after cooking, these hair-like particles present an appearance simulating fly "specks" or fly particles. This makes the purchaser think that the final product has impurities in it. The orientation of the apple in an inverted position for inspection renders any apples not freed of this fuzz by the paring process more readily detectable by the inspector.

Most of the apples are conveyed by pins 34 directly from the paring and coring units past the inspector to the slicing units 24 described in my Patent No. 3,134,415. However, there are some apples which which do not pass inspection. The inspector removes any apples having any fuzz, spoiled spots, or skin thereon and places them on an endless belt 39 (FIG. 2) traveling to the right as indicated by the arrow in FIG. 2. A diagonally positioned bar 40 is provided to divert the apples traveling on the belt 39 onto the trimmer table 26 where they are picked up by one or more trimmers who remove the fuzz, spoiled spots, or skin not removed in the automatic paring process.

After the apples rejected by the inspector have been completely trimmed, they are each deposited on a shaft 42 projecting through a hole 44, cut in the trimmer table. The apple slides downwardly on shaft 42 (see FIG. 1) and passes through the slicer mechanism 24, after which it is deposited on a conveyor belt 46 and transported forwardly as indicated by an arrow 48 in FIG. 2. Belt 46 deposits the sliced apples onto a conveyor belt 50 traveling in a direction perpendicular to the course of travel of belt 46 as indicated by arrow 51. Belt 50 carries the sliced apples to a point of further processing, i.e., cooking or freezing.

Conveyor belt 28 continues to move the apples remaining on pins 34 to the right as viewed in FIG. 1 until it passes over pulley 52. As the belt moves around pulley 52, pins 34 move in a semi-circular path terminating in a depending position. The apples are prevented from falling off pins 34 by a pair of spaced arcuate guides 53 (FIG. 1) located on the right end of frame 20.

When the pins 34 reach a depending position, the apples transported thereon slide downwardly on the pins 34 until they engage a horizontally extending metal pan (not shown) being supported by cross member 23A (FIG. 1); this pan is vertically spaced from pins 34 only a limited amount to prevent the apples from falling off the pins 34 as they are transported by conveyor 28 (see FIG. 13).

A plurality of spaced slicing units 24 are located to the left of this pan (not shown) as shown in FIG. 1. Units 24 are provided with vertically oriented shafts 54, 66, 70 and 71 respectively. The driving means controlling the motion of the conveyor 28, to be described hereinafter in (I), is arranged to stop the belt intermittently with pins 34 in alignment with these vertically extending shafts, as shown in FIG. 13.

When the driving means stops the conveyor 28, retractable slides (not shown) are sequentially withdrawn as described in my Patent No. 3,134,415, thereby permitting the apples to slide off pins 34 and onto the aligned shafts 54, 66, 70 and 71 which guide the apples into the slicer.

Four slicing units 24 are provided, spaced three pitches apart, for purpose of this application, the word "pitch" refers to the distance between pins 34. The conveyor moves four pitches during each intermittent forward motion. Assuming, for purposes of explanation, that the first apple in line is stopped in alignment with shaft 54 and removed in the manner just described, then the apple on the next pin to the right of the first apple or the second apple will be advanced four pitches, of the pins 34, during the next motion of the conveyor 28 into vertical alignment with shaft 66 while the fifth apple will be advanced into a vertically aligned position with shaft 54. Then the second and fifth apples are removed in the manner described above. The next motion of the conveyor will move the third apple into vertical alignment with shaft 70, the sixth into alignment with shaft 66 and the ninth in alignment with shaft 54. Then the third, sixth and ninth apples are removed in the manner described above. The next motion will move the fourth apple in line into vertical alignment with shaft 71, the seventh into alignment with shaft 70, the tenth into alignment with shaft 66, and the thirteenth into alignment with shaft 54. Thereafter, these last four apples are removed as described above. This operation continues to remove all apples from the pins 34.

This word description of how apples are transferred to shafts 54, 66, 70 and 71 is better illustrated below by the first ten apples in line being designated by the numerals 1–10 consecutively, and the consecutive stops of the conveyor 28 being designated by Roman numerals in the left-hand columns.

| Stops of conveyor 28 | Shaft 71 | Shaft 70 | Shaft 66 | Shaft 54 |
|---|---|---|---|---|
| I | | | | 1 |
| II | | | 2 | 5 |
| III | | 3 | 6 | 9 |
| IV | 4 | 7 | 10 | X |
| V | 8 | X | X | X |

It will be understood that the intermittent motion of conveyor 28 is coordinated with both the paring and coring units 22 and the slicer units 24 so that all apples will be deposited by the paring and coring units 22 on pins 34 and subsequently all apples will be transferred from pins 34 to shafts 54, 66, 70 and 71 and in turn deposited in the slicer units 24.

The mechanics of how these apples are transferred onto pins 54, 66, 70 and 71 are fully described in my Patent No. 3,134,415.

By the above operation, it is understood that all apples deposited on all eight cups 30–33 of the paring and coring machine units are pared, cored, trimmed, sliced and deposited on conveyor belt 50, by which they are carried to a point of further process.

The present invention deals only with the apparatus for inspecting the apples as described above and I shall below describe the drive system by which the inspection apparatus is controlled. Also I shall describe the drive mechanism by which the following apparatus is controlled, but I shall not describe the details of the following apparatus described in detail in my Patent No. 3,134,415 which is not a part of this invention: The paring apparatus, the coring apparatus, apparatus for maintaining apples in an oriented position prior to being transferred to the conveyor pins 34.

Referring to FIG. 3, a power source 72, preferably an electric motor, drives a shaft 73 on which is mounted a pulley 74, driving a V-belt 76, in turn driving a somewhat larger pulley 77. Pulley 77 is rigidly mounted on a shaft 78 pivotally mounted to the frame 20. A smaller pulley 79 rigidly mounted on shaft 78 drives a V-belt 80 which in turn drives a pulley 82 rigidly mounted on a drive shaft 84 having a sprocket 86 and a small gear 88 rigidly mounted thereon.

The gear 88 meshes with and drives a larger gear 90 rigidly mounted on a shaft 91, having a smaller gear 92 rigidly mounted thereon which meshes with and drives a large gear 93 rigidly mounted on a shaft 94. The combination of gears 88, 90, 92 and 93 reduces the speed of shaft 94 in relationship to the speed of the shaft 84.

Referring to FIG. 1, the gear 93 and shaft 94 may be seen therein. Eight bevel gears 96, and sixteen cams (not shown) rigidly mounted on shaft 94 drive and control the eight paring and coring machine units 22.

Referring to FIG. 3, a sprocket 99 rigidly mounted on shaft 94 drives a chain 100, in turn driving a sprocket 102, rigidly mounted on a shaft 104 rotatably mounted on frame 20. This shaft carries cams mounted in proper relationship to the units 22 for controlling the orienting and transfer apparatus described in my Patent No. 3,134,415.

Referring to FIG. 3, the sprocket 86 drives a chain 110 which in turn drives a sprocket 111 rigidly mounted on a drive shaft 112. Four small gears 113 rigidly mounted on shaft 112 mesh with and drive four larger gears 114, each of which is rigidly mounted on one of four shafts 116. Each gear 114 through each shaft 116 controls a slicer mechanism 24, not shown or described in detail because they are old per se. Four sprockets 117 rigidly mounted on shafts 116 drive four chains 118 which in turn drive four smaller sprockets 119, connected to gears mounted inside of a gear box 121. The gears (not shown) mounted inside of the box 121 control a device for celling apple seeds which is not described because it is old per se. The slides above shafts 54, 66, 70 and 71 are also controlled by the gears 114.

A sprocket 120 rigidly mounted on shaft 85 drives a chain 122 which in turn drives a sprocket 124 rigidly mounted on a shaft 126. Referring to FIG. 2, the shaft 126 continuously drives a gear 127, which has a tooth portion 128 and a vertical flat portion 129. Gear 127 controls the conveyor 28. Portion 128 is a semi-circular bevel gear having teeth extending 180 degrees around the circumference thereof, adapted to mesh with and drive a bevel gear 130 rigidly mounted on a shaft 133 which in turn drives a sprocket or pulley 134 (FIG. 1) rigidly mounted thereto. Pulley 134 (FIG. 1) engages and drives conveyor 28. Just before the bevel gear portion 128 is rotated free of the teeth of gear 130, an extension 132 rigidly connected to gear 130 is brought into registry with flat portion 129 of gear 127. The flat portion 129 of gear 127 is adapted to engage and pass vertically over a flat right end of extension 132 as illustrated in FIG. 2 while gear 127 is being rotated by shaft 126, thereby maintaining gear in a stationary position while gear 127 continues to turn. This merely serves to intermittently stop conveyor 28. It will be understood that any desired interrupter could be used. When flat portion 129 is disengaged from the flat right end of extension 132, the teeth of portion 128 of gear 127 once again mesh with the teeth of gear 130 to drive shaft 133, pulley 134 and conveyor 28.

It will be understood that the particular arrangement of pulleys, gears and cams described above may be varied to give any desired relationship of speeds, starting and stopping actions, and coordinated operations between the paring apparatus, coring apparatus, conveying apparatus and the slicing apparatus without departing from the spirit of my invention.

The primary means by which the apple is retained on blade 231 after paring and coring thereof, until the blade reaches the depending position shown on FIG. 4, is the frictional engagement of the apple with blade 231. A rocker arm 273 has been provided as auxiliary means for preventing apples from being prematurely discharged from blade 231 while the blade makes its downward stroke described in my Patent No. 3,134,415. Referring to FIG. 4, the rocker arm 273 has a selected curvature approximating the course of travel of the apple during the last 90° of downward motion of the blade to the position shown in FIG. 4. During the downward stroke of blade 231, the rocker arm 273 is maintained in a vertical plane in close proximity to the blade to prevent the apple from falling off the blade 231.

To carry forth the proper orientation of the apple, it is necessary to maintain the apple on blade 231 until a pin 34 of conveyor 28 stops, at a position directly below the blade, to receive the apple. The blade 231 and a pin 34 arrive in the same vertical plane simultaneously. Arm 273 is then pivoted out of the way by the camming action described in my Patent No. 3,134,415 to permit the transfer of the apple from the blade 231 to pin 34.

Referring to FIG. 4, the apparatus for transferring apples to pins 34 of the conveyor system 28 includes the cam 108 effective to pivot rocker arm 273 clockwise as viewed from the left end of FIG. 4. This enables the apple to be transferred from blade 231 onto the pin 34 positioned directly below the blade. It will be understood that the pins 34 are positioned below blade 231 at the broken lines by interrupted motion of conveyor 28 described above. The apple is then transferred onto pin 34 by an ejector arm 277 through the linkage described below.

The arm 277 has an extension 278 (shown in broken lines) pivotally mounted at 279 to a support member 280 rigidly mounted on a horizontal member 23F of the main frame 20. When a roller 282 rotatably mounted on ejector arm 277 is cammed upwardly by cam 106, arm 277 pivots about 279 in a counterclockwise direction with respect to FIG. 4 in opposition to a tension spring 284. Spring 284 is attached at one end to ejector arm 277 and at its other end to the frame.

Cams 106 and 108 rigidly mounted together and keyed to shaft 104 rotate in a clockwise direction as viewed in FIG. 4 and indicated by the arrow 288. Simultaneously, with the arrival of the coring blade 231 at the position shown in FIG. 4, the follower roller 290 by which the rocker arm 273 is controlled passes from a lower portion 291 of cam 108 to a higher portion 292 of cam 108, and the rocker arm is pivoted away from the blade. The roller 290 is rotatably mounted on an arm 294 keyed to shaft 296 which in turn is rigidly connected through an arm member 298 to rocker arm 273. The left end of arm 273, as viewed in FIG. 4, has an extension 299 rigidly mounted thereto in alignment with shaft 296. This extension is rotatably mounted in a bushing 300. Bushing 300 is mounted on a horizontal member 23E. Thus, the rocker arm 273 is pivoted in a counterclockwise direction as viewed from the left hand end of FIG. 4 in opposition to a tension spring 302. Simultaneously, as the roller 290 is cammed upwardly on the higher portion 292 of cam 108, the roller 282 controlling ejector arm 277 is also cammed upwardly on a portion 293 of cam 106 to actuate ejector arm 277 to push the apple off blade 231 and thereby transfer it to the pin 34 positioned directly below blade 231.

After the apple has been transferred from the blade onto pin 34, the roller 290 passes onto the low portion 291 of cam 108 and the rocker arm is returned to its normal vertical position shown in FIG. 4 by means of a spring 302 attached at one end to rocker arm 273 and at the other end and to a rod 304 rigidly connected to a horizontal member 23F. Immediately after the ejector arm 277 has transferred the apple onto pin 34, it is returned to its original position shown in FIG. 4 as a result of roller 282 being cammed downwardly by cam 106.

Once the apple has been transferred to pin 34, it is conveyed past the inspection area in the manner described above with reference to FIG. 1.

This is a continuous process with apples being pared and cored alternately on every second paring and coring machine unit 22 in coordination with the interrupted motion of the conveyor 28 to provide a machine whereby a pared and cored apple is deposited on every pin 34 prior to passing the point of inspection 35 (see FIG. 2). The four slicer mechanisms 24 for receiving apples not rejected by the inspector and the four sliding mechanisms located above these four slicers are coordinated with the conveyor 28 whereby all the apples being conveyed on pins 34 are discharged into one of the four slicer mechanisms 24 prior to all pins passing to the left of shaft 71 (see FIG. 1).

Preferably, the entire machine is driven by a single power source which actuates all of the working parts of this embodiment of my invention through a series of gears, sprockets, chains, cams and follower rollers, in timed sequence to accomplish all of the objects of this invention.

It will be understood that the conveyor 28 could be eliminated and that each apple supported on a blade 231 be transferred directly onto one of the slicer shafts 54, 66, 70 or 71.

It will be further understood that many parts are adjustable to vary the timing of related parts.

While there has been shown and described the preferred forms of embodiments of my invention, it will be apparent that various changes and modifications may be made therein, particularly in the form and relation of parts without departing from the spirit of the invention as set forth in the appended claims.

I claim:

1. Apparatus for processing apples comprising, in combination, a first endless belt carrying a plurality of spaced vertical pins rigidly mounted thereon each for receiving a cored apple, an inspection area along at least part of the length of said belt, means for driving said endless belt in substantially a horizontal plane past said inspection area, and means operatively associated with said belt engaging said apples for rotating the apples about said pins as they are being conveyed past said inspection area.

2. Apparatus for processing apples comprising, in combination, a first endless belt carrying a plurality of spaced vertical pins each for receiving a cored apple, an inspection area along at least part of the length of said belt, means for driving said endless belt in substantially a horizontal plane past said inspection area, means operatively associated with said belt for rotating said apples about said pins as they are being conveyed past said inspection area, said rotating means comprising a second endless belt extending parallel and substantially adjacent said first endless belt, said second endless belt frictionally engaging apples carried on said pins and means for driving said second belt.

3. Apparatus for processing apples comprising, in combination, a first endless belt carrying a plurality of spaced vertical pins each for receiving a cored apple, an inspection area along at least part of the length of said belt, means for driving said endless belt in substantially a horizontal plane past said inspection area, means operatively associated with said belt for rotating said apples about said pins as they are being conveyed past said inspection area, said rotating means comprising a second endless belt extending parallel and substantially adjacent said first endless belt, said second endless belt frictionally engaging apples carried on said pins and means for driving said second belt in the same direction of travel as that of said first endless belt but at a different rate of travel from that of said first endless belt.

4. Apparatus for processing apples comprising, in combination, a first endless belt carrying a plurality of spaced vertical pins each for receiving a cored apple, an inspection area along at least part of the length of said belt, means for driving said endless belt in substantially a horizontal plane past said inspection area, means operatively associated with said belt for rotating said apples about said pins as they are being conveyed past said inspection area, said rotating means comprising a roughened surface extending parallel and substantially adjacent said first endless belt, said roughened surface engaging said apples for rotation thereof.

5. Apparatus for processing apples comprising, in combination, a first endless belt carrying a plurality of spaced vertical pins each for receiving a cored apple, an inspection area along at least part of the length of said belt, means for driving said endless belt in substantially a horizontal plane past said inspection area, means operatively associated with said belt for rotating said apples about said pins as they are being conveyed past said inspection area, said rotating means comprising a roughened surface extending parallel and substantially adjacent said first endless belt, said roughened surface engaging said apples for rotation thereof, and said roughened surface is elevated with respect to said belt.

6. Apparatus for processing apples comprising, in combination, a first endless belt carrying a plurality of spaced vertical pins each for receiving a cored apple, an inspection area along at least part of the length of said belt, means for driving said endless belt in substantially a horizontal plane past said inspection area, means operatively associated with said belt for rotating said apples about said pins as they are being conveyed past said inspection area, said rotating means comprising a second endless belt extending parallel, substantially adjacent, and elevated from said first endless belt, said second belt engaging said apples for rotation thereof about said pins and at a position elevated from said first belt.

7. Apparatus for processing apples comprising, in combination, a first endless belt carrying a plurality of spaced vertical pins each for receiving a cored apple, an inspection area along at least part of the length of said belt, means for driving said endless belt in substantially a horizontal plane past said inspection area, means operatively associated with said belt for rotating said apples about said pins as they are being conveyed past said inspection area, said rotating means comprising a second endless belt extending parallel, substantially adjacent and elevated from said first endless belt, said second belt engaging said apples for rotation thereof about said pins and at a position elevated from said first belt, and a ramp means coactive with said conveyor for elevating the apples on said pins from said first belt to said second belt.

8. Apparatus for processing apples comprising, in combination, a first endless belt carrying a plurality of spaced vertical pins each for receiving a cored apple, an inspection area along at least part of the length of said belt, means for driving said endless belt in substantially a horizontal plane past said inspection area, means operatively associated with said belt for rotating said apples about said pins as they are being conveyed past said inspection area, said rotating means comprising a surface extending parallel, substantially adjacent and elevated from said first endless belt for frictionally engaging and rotating said apples about said pins in a position elevated from said belt.

9. Apparatus for processing apples comprising, in combination, a first endless belt carrying a plurality of spaced vertical pins rigidly mounted thereon each for receiving a cored apple, an inspection area along at least part of the length of said belt, means for driving said endless belt in substantially a horizontal plane past said inspection area, means operatively associated with said belt for engaging said apples for rotating the apples about said pins as they are being conveyed past said inspection area, and means adjacent said first belt for receiving and transporting apples being rejected at said inspection area to a trimming area where apples are received.

References Cited by the Examiner
UNITED STATES PATENTS

| | | | |
|---|---|---|---|
| 1,272,346 | 7/1918 | Jefferies | 198—131 X |
| 2,577,594 | 12/1951 | Taylor | 198—33 |
| 2,639,799 | 5/1953 | Pikal | 198—33 X |
| 2,911,089 | 11/1959 | Carter | 198—33 |

SAMUEL F. COLEMAN, *Primary Examiner.*

EDWARD A. SROKA, *Examiner.*